US007814937B2

(12) United States Patent
Khoshnevis

(10) Patent No.: US 7,814,937 B2
(45) Date of Patent: Oct. 19, 2010

(54) DEPLOYABLE CONTOUR CRAFTING

(75) Inventor: Behrokh Khoshnevis, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 275 days.

(21) Appl. No.: 11/552,741

(22) Filed: Oct. 25, 2006

(65) Prior Publication Data

US 2007/0181519 A1 Aug. 9, 2007

Related U.S. Application Data

(60) Provisional application No. 60/730,418, filed on Oct. 26, 2005, provisional application No. 60/730,560, filed on Oct. 26, 2005, provisional application No. 60/733,451, filed on Nov. 4, 2005, provisional application No. 60/744,483, filed on Apr. 7, 2006, provisional application No. 60/807,867, filed on Jul. 20, 2006, provisional application No. 60/820,046, filed on Jul. 21, 2006.

(51) Int. Cl.
*A01G 25/09* (2006.01)

(52) U.S. Cl. ........................ 137/899; 137/615; 212/180

(58) Field of Classification Search ................. 137/343, 137/615, 899; 212/294, 180
See application file for complete search history.

(56) References Cited

U.S. PATENT DOCUMENTS

| | | | | |
|---|---|---|---|---|
| 2,674,378 | A * | 4/1954 | Meyer et al. | 212/178 |
| 2,772,004 | A * | 11/1956 | Noble | 212/294 |
| 2,784,850 | A * | 3/1957 | Batson et al. | 212/167 |
| 3,032,082 | A * | 5/1962 | Vilain | 141/388 |
| 3,074,563 | A * | 1/1963 | Montgomery | 212/294 |
| 3,680,720 | A * | 8/1972 | Strange | 414/787 |
| 3,707,990 | A * | 1/1973 | Schaible et al. | 137/615 |
| 3,784,029 | A * | 1/1974 | Pelts | 212/73 |
| 3,942,554 | A * | 3/1976 | Werner et al. | 137/615 |

(Continued)

FOREIGN PATENT DOCUMENTS

AT 385550 11/1988

(Continued)

OTHER PUBLICATIONS

International Search Report dated Jul. 25, 2007 for PCT Application Serial No. PCT/US06/42156.

(Continued)

*Primary Examiner*—John Rivell
*Assistant Examiner*—Craig Price
(74) *Attorney, Agent, or Firm*—McDermott Will & Emery LLP

(57) ABSTRACT

A deployable crafting machine may include a vehicle and a gantry system. The gantry system may be configured to be collapsed on the vehicle during which the gantry system is inoperable and to be expanded during which the gantry system is operable and supported at least in part by the vehicle. A deployable crafting process may include moving a vehicle to a first location while a gantry system is stored on the vehicle in a collapsed and inoperable state and expanding the gantry system into an operable state after the vehicle arrives at the first location during which the gantry system is supported at least in part by the vehicle.

33 Claims, 9 Drawing Sheets

U.S. PATENT DOCUMENTS

| | | | | | |
|---|---|---|---|---|---|
| 3,973,679 | A | * | 8/1976 | Hass et al. | 212/288 |
| 4,091,936 | A | * | 5/1978 | Wuerflein et al. | 212/177 |
| 4,332,328 | A | * | 6/1982 | Otto et al. | 212/180 |
| 4,529,094 | A | * | 7/1985 | Wadsworth | 212/255 |
| 4,579,234 | A | * | 4/1986 | Delago et al. | 212/178 |
| 4,625,760 | A | * | 12/1986 | Mertens | 137/615 |
| 4,660,731 | A | * | 4/1987 | Becker | 212/175 |
| 4,664,270 | A | * | 5/1987 | Voelz | 212/175 |
| 4,706,825 | A | * | 11/1987 | Johnson | 212/294 |
| 4,718,563 | A | * | 1/1988 | Ellgass | 212/343 |
| 4,786,266 | A | * | 11/1988 | Fozard et al. | 441/5 |
| 4,867,211 | A | * | 9/1989 | Dodge et al. | 141/279 |
| 5,213,222 | A | * | 5/1993 | Becker | 212/253 |
| 5,443,169 | A | * | 8/1995 | Pagel et al. | 212/298 |
| 5,484,069 | A | * | 1/1996 | Lanning | 212/270 |
| 5,634,503 | A | * | 6/1997 | Musil et al. | 141/232 |
| 5,656,230 | A | | 8/1997 | Khoshevis | |
| 5,823,218 | A | * | 10/1998 | Schlecht et al. | 137/2 |
| 5,947,308 | A | * | 9/1999 | Markelz | 212/294 |
| 6,142,180 | A | * | 11/2000 | Woodling et al. | 137/615 |
| 6,786,233 | B1 | * | 9/2004 | Willner et al. | 137/615 |
| 7,153,454 | B2 | * | 12/2006 | Khoshnevis | 264/34 |
| 2002/0117219 | A1 | * | 8/2002 | Anderson et al. | 137/615 |
| 2004/0099983 | A1 | | 5/2004 | Dirscherl | |
| 2004/0173554 | A1 | * | 9/2004 | Eiler | 212/294 |
| 2005/0196484 | A1 | * | 9/2005 | Khoshnevis | 425/463 |

FOREIGN PATENT DOCUMENTS

| | | | | |
|---|---|---|---|---|
| GB | 892994 | | | 4/1962 |
| GB | 2267110 | | | 11/1993 |
| WO | WO 0242056 | | | 5/2002 |
| WO | WO2005/070657 | A1 | | 8/2005 |
| WO | WO 2005070657 | A1 | * | 8/2005 |
| WO | WO 2007050972 | A2 | * | 5/2007 |

OTHER PUBLICATIONS

EPO Examination Report for EPO Application No. 04704067.0, dated Aug. 7, 2009.

European Patent Office. Examination Report for EP Application No. 04 704 067.0, entitled "Multi-Nozzle Assembly for Extrusion of Wall," mailed Jan. 22, 2010.

Khoshnevis, B. et al. 2002. Automated Construction Using Contour Crafting: Applications on Earth and Beyond. International Symposium on Automation and Robotics in Construction, 19th (ISARC). Proceedings. National Institute of Standards and Technology, Gaithersburg, Maryland. Sep. 23-25, 2002, pp. 489-494.

* cited by examiner

DEPLOYABLE CONTOUR CRAFTING

CROSS-REFERENCE TO RELATED APPLICATIONS

This application is based upon and claims priority to U.S. Provisional Patent Application Ser. No. 60/730,418, entitled "Deployable Contour Crafting Machine," filed Oct. 26, 2005. This application is also related to U.S. patent application Ser. No. 10/760,963, entitled "Multi-Nozzle Assembly for Extrusion of Wall," filed Jan. 20, 2004, which claims priority to and incorporates by reference U.S. Provisional Application Ser. No. 60/441,572, entitled "Automated Construction," filed Jan. 21, 2003. This application is also related to U.S. patent application Ser. No. 11/040,401, entitled "Robotic Systems for Automated Construction," filed Jan. 21, 2005, U.S. patent application Ser. No. 11/040,602, entitled "Automated Plumbing, Wiring, and Reinforcement," filed Jan. 21, 2005, and U.S. patent application Ser. No. 11/040,518, entitled "Mixer-Extruder Assembly," filed Jan. 21, 2005, all three of which claim priority to U.S. Provisional Application Ser. No. 60/537,756, entitled "Automated Construction Using Extrusion," filed Jan. 20, 2004. This application is also related to the following U.S. Provisional Applications: Ser. No. 60/730,560, entitled "Contour Crafting Nozzle and Features for Fabrication of Hollow Structures," filed Oct. 26, 2005; Ser. No. 60/733,451, entitled "Material Delivery Approaches for Contour Crafting," filed Nov. 4, 2005; Ser. No. 60/744,483, entitled "Compliant, Low Profile, Non-Protruding and Genderless Docking System for Robotic Modules," filed Apr. 7, 2006; Ser. No. 60/807,867, entitled "Lifting and Emptying System for Bagged Materials," filed Jul. 20, 2006; and Ser. No. 60/820,046, entitled "Accumulator Design for Cementitious Material Delivery," filed Jul. 21, 2006. The entire content of all of these applications is incorporated herein by reference.

BACKGROUND

1. Field

This application relates to construction and, more particularly, the extrusion of buildings and other structures from unhardened material.

2. Description of Related Art

Buildings and other structures may be extruded from unhardened material, as illustrated in the U.S. patent applications incorporated by reference in the Cross-Reference to Related Applications section of this application.

Quickly and easily deploying this technology at construction sites, however, can be challenging.

SUMMARY

A deployable crafting machine may include a vehicle and a gantry system. The gantry system may be configured to be collapsed on the vehicle during which the gantry system is inoperable and to be expanded during which the gantry system is operable and supported at least in part by the vehicle.

The gantry system may include a bridge and a pivot attaching the vehicle to the bridge.

The bridge may be configured to swing and the pivot may be configured to maintain the bridge in a substantially horizontal position while the bridge swings.

The gantry system may include a rail and a platform that is configured to support the rail and be attached to and detached from the vehicle. The platform may include wheels. The wheels may be configured to be raised and lowered. The wheels may be configured to rotate around a vertical axis.

The gantry system may include a second rail attached to the vehicle and an alignment system configured to aid in aligning the two rails with respect to one another.

The alignment system may be configured to aid in aligning the two rails to be parallel. The alignment system may include a pivot between the vehicle and the rail that is attached to the vehicle.

The alignment system may be configured to aid in aligning the two rails to be at the same horizontal level.

The gantry system may include a forward truss, a hinge attaching the vehicle to the forward truss, a rear truss, and a hinge attaching the vehicle to the rear truss. The hinges may be configured to pivot about two orthogonal axes.

The gantry system may include a rail that is supported by the forward truss and another rail that is supported by the rear truss.

The gantry system may include a rail having two ends, wherein one end of the rail is configured to be supported by an end of the forward truss and the other end of the rail is configured to be supported by an end of the rear truss while the gantry system is expanded.

The gantry system may include a bridge that has at least two sections. The gantry system may include a hinge attaching the two sections to one another.

The gantry system may include a bridge and two rails, and the deployable crafting machine may include a material-delivery nozzle movably attached to the bridge and a positioning system configured to controllably move the nozzle along the bridge and to controllably move the bridge along the rails.

The positioning system may include one or more motors and one or more motor controllers.

The motor controllers may be mounted on the vehicle.

The deployable crafting machine may include an electric generator mounted on the vehicle.

The deployable crafting machine may include a pump configured to pump unhardened cementitious material mounted on the vehicle.

The deployable crafting machine may include a tank configured to hold unhardened cementitious material mounted on the vehicle.

The gantry system may be configured to be completely supported by the vehicle while expanded.

A deployable crafting process may include moving a vehicle to a first location while a gantry system is stored on the vehicle in a collapsed and inoperable state and expanding the gantry system into an operable state after the vehicle arrives at the first location during which the gantry system is supported at least in part by the vehicle.

The deployable crafting process may include crafting a structure at the first location using the expanded gantry system.

The crafting step may include moving a material-delivery nozzle along a bridge and dispensing cementitious material from the nozzle while the nozzle is moving.

The crafting step may include moving the bridge along rails and dispensing cementitious material from the nozzle while the bridge is moving.

The deployable crafting process may include moving the vehicle from the first location to a second location after the crafting and crafting a second structure at the second location using the gantry system.

The gantry system may be collapsed before the vehicle is moved from the first location to the second location.

The gantry system may remain expanded while the vehicle is moved from the first location to the second location.

A deployable crafting process may include moving a vehicle to a first location while a gantry system is stored on the vehicle in a collapsed and inoperable state, expanding the gantry system into an operable state after the vehicle arrives at the first location, using the expanded gantry system to craft a structure at the first location, collapsing the gantry system into the collapsed and inoperable state on the vehicle at the first location, moving the vehicle to a second location while the gantry system is stored on the vehicle in the collapsed and inoperable state, expanding the gantry system into an operable state after the vehicle arrives at the second location, using the expanded gantry system to craft a structure at the second location, and collapsing the gantry system into the collapsed and inoperable state on the vehicle at the second location.

These, as well as other components, steps, features, objects, benefits, and advantages, will now become clear from a review of the following detailed description of illustrative embodiments, the accompanying drawings, and the claims.

These drawings disclose illustrative embodiments of the concepts that are discussed, illustrated and inherent herein. They illustrate these concepts; they do not set forth all of their embodiments. Numerous other embodiments may be used in addition or instead. Details that are apparent are also often omitted to save space or for more effective illustration. When the same numeral appears in different drawings, it is intended to refer to the same or like components or steps.

DETAILED DESCRIPTION OF ILLUSTRATIVE EMBODIMENTS

Illustrative embodiments of certain concepts are now discussed. This discussion illustrates these concepts; it does not set forth all of their embodiments. Numerous other embodiments may be used in addition or instead. Details that are apparent are also often omitted to save space or for more effective presentation.

Figure 1:
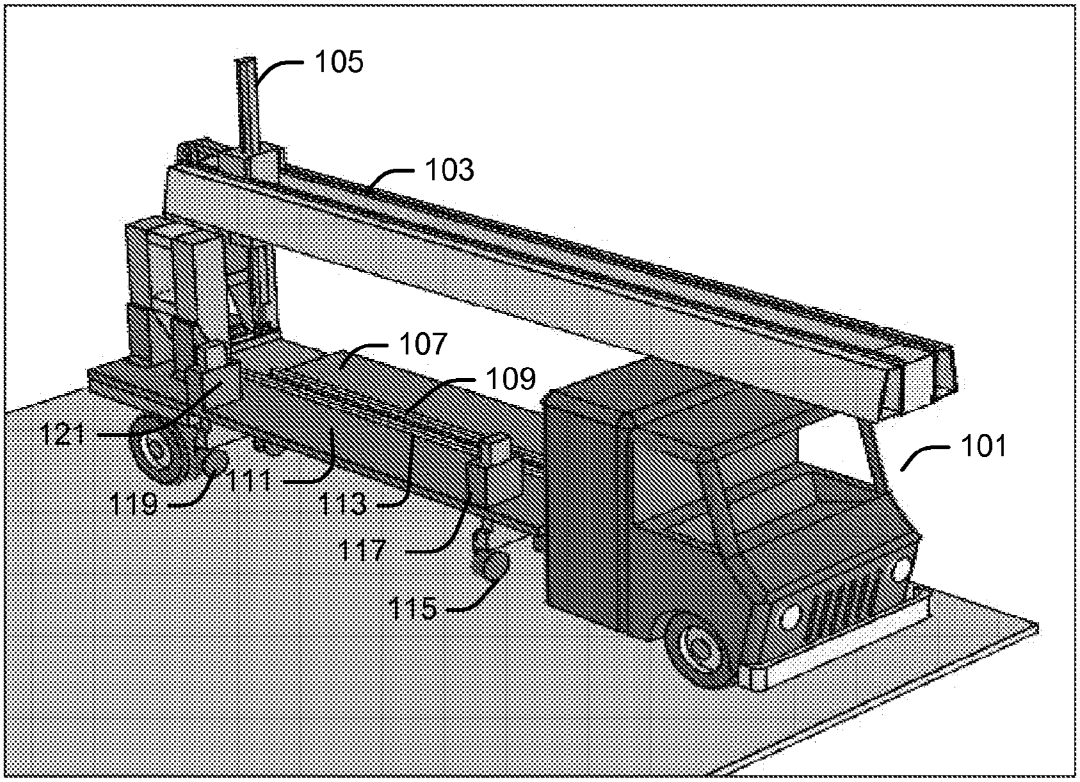
FIG. 1 illustrates a deployable crafting machine having a gantry system in a collapsed and inoperable state.

FIG. 1 illustrates a deployable crafting machine having a gantry system in a collapsed and inoperable state.

As illustrated in FIG. 1, a vehicle 101 may have a bridge 103 stored on it, a material delivery nozzle 105 movably attached to the bridge 103, a vehicle platform 107 with a vehicle rail 109 attached to it, and a mobile platform 111 with a mobile rail 113 attached to it. The vehicle platform 107 may be pivotally attached to the vehicle 101 with a vertical pivot, thus allowing the vehicle platform 107 to be rotated in a horizontal plane. The vehicle platform 107 may instead be fixedly attached to the vehicle 101. The vehicle platform 107 may instead simply be part of a bed of the vehicle 101.

The vehicle 101 may be any type of vehicle. It may be configured to travel on land, water or in air. It may include a motor or other propulsion means to propel the vehicle. It may be or include a truck. The truck may be converted to carry the gantry or specially built for this purpose.

The mobile platform 111 may be releasably secured to the vehicle 101 by any means, such as by clamps (not shown). The mobile platform 111 may include front extendable wheels 115 having an extendable height that is controlled by a height adjustment mechanism 117 and rear extendable wheels 119 having an extendable height that is controlled by an adjustment mechanism 121. The front extendable wheels 115 and the rear extendable wheels 119 are illustrated in FIG. 1 in a retracted position, i.e., lifted from the ground.

The gantry system is illustrated in FIG. 1 in a collapsed and inoperable state on the vehicle 101. While in this state, the gantry system may be transported to a construction site.

Upon arrival at the construction site, the extendable wheels 115 and 119 may be lowered using the height adjustment mechanisms 117 and 121, respectively, so that they engage the ground. The mobile platform 111 may then be detached from the vehicle 101 and rolled away from it. The wheels 115 and 119 may be locked in the sideways position during this process, as illustrated in FIG. 1.

Figure 2:
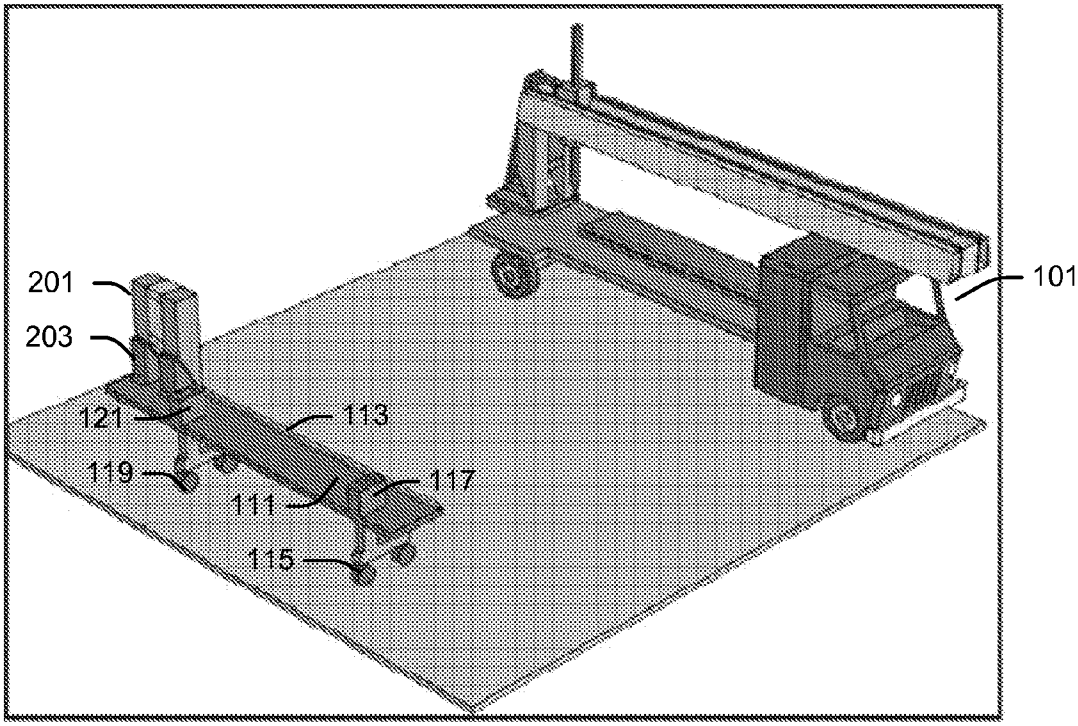
FIG. 2 illustrates the deployable crafting machine shown in FIG. 1 after a mobile platform that supports a rail has been separated from a vehicle.

FIG. 2 illustrates the deployable crafting machine shown in FIG. 1 after the mobile platform 111 that supports the mobile rail 113 has been separated and rolled away from the vehicle 101 by sideways movement when the gantry system is operable.

Any means may be used to cause the mobile platform 111 to be rolled away from the vehicle 101. For example, the mobile platform 111 may simply be pushed or pulled by hand. One or more electric motors may or may not be coupled to one or more of the wheels 115 and/or 119 and may be used in addition or instead. These motors may be gasoline or electric or any other type. If electric and attached to the mobile platform 111, the mobile platform 111 may be teetered to the vehicle 101 by an electrical chord over which electricity may be supplied from the vehicle 101 to the motors.

If motors are used, they may be controlled manually by a motor controller mounted on the vehicle 101, the mobile platform 111, and/or elsewhere. In lieu of or in addition to being controlled by a person, the motor controller and platform release mechanism may be controlled by a computer so as to cause the entire separation and roll-away process to be partially or fully automated.

As shown in FIG. 2, a support column 201 may rest on a portion of the mobile rail 113 and may be secured in position through a releasable attachment to a column support frame 203. A conical pin (not shown) may be used to effectuate the releasable attachment.

After being rolled apart from the vehicle 101, an alignment process may be implemented for the purpose of aligning the mobile rail 113 on the mobile platform 111 with the vehicle rail 109 on the vehicle platform 107.

The alignment process may ensure that the mobile rail 113 is not offset longitudinally by a significant amount from the vehicle rail 109. In practice, no adjustment may be necessary, particularly if the construction site is relatively flat and the wheels 115 and 119 were locked in the position shown in FIG. 2 while the platform 111 was rolled away from the vehicle 101. Further, the length of the vehicle rail 109 and the mobile rail 113 may be longer than is needed for the full traverse of the bridge 103 (as illustrated and explained below), thus allowing the gantry system to function properly, even with a longitudinal misalignment. If the longitudinal misalignment is too great, however, the vehicle 101 may be moved forward or backward, as needed.

The alignment process may also or instead ensure that the mobile rail 113 is substantially parallel with the vehicle rail 109 and separated by the length of the bridge 103. The platform 111 may be rolled laterally as needed to effectuate this alignment, again with or without the use of one or more motors.

After the platform 111 and the vehicle 101 are aligned, as described above, stabilizers may be applied to ensure that both remain in their aligned positions. The stabilizers may include outriggers, wheel locks, spikes and tensioned cables, and/or servo-driven active counterweights (similar to what is used in modern high rises to damp an earthquake).

The mobile rail 113 may then be aligned so that it is in the same horizontal plane as the vehicle rail 109. This may be effectuated by appropriate adjustments to the height adjustment mechanisms 117 and/or 121. Hydraulic pistons, electric motors, and/or other devices may be used in connection with this effort. These devices may be part of the adjustment mechanisms 117 and/or 121 or separate from them. These devices may be controlled manually and/or with a computer so as to partially or fully automate the alignment process.

To ensure that the mobile rail 113 is parallel to the vehicle rail 109, the vehicle rail 109 may be rotated on its platform 107 as needed in the horizontal plane and then locked in place with a locking mechanism (not shown).

A variety of additional devices may be used to aid in the alignment process, including GPS, level sensors, optical sensors, lasers, and/or a combination of such devices.

The entire process of detaching the mobile platform 111, separating it from the vehicle 101, and aligning the mobile rail 113 to the vehicle rail 109 may be performed manually. When assisted with motors, hydraulic devices or other types of devices, a joy stick or other type of control device may be provided for the operator. A computer may in addition or instead be used to assist in connection with this positioning or to fully automate the entire process.

The alignment controls and/or computer may be mounted on the vehicle 101, the mobile platform 111, or elsewhere.

Appropriate control system may be included to regulate and smoothen the movements. For example, the signal from a manually-controlled joystick may be channeled through an acceleration control system that is configured to cause the movements requested by an operator to accelerate and deaccelerate at a controlled level, thus avoiding jarring the components and making the task easier to implement.

Figure 3:
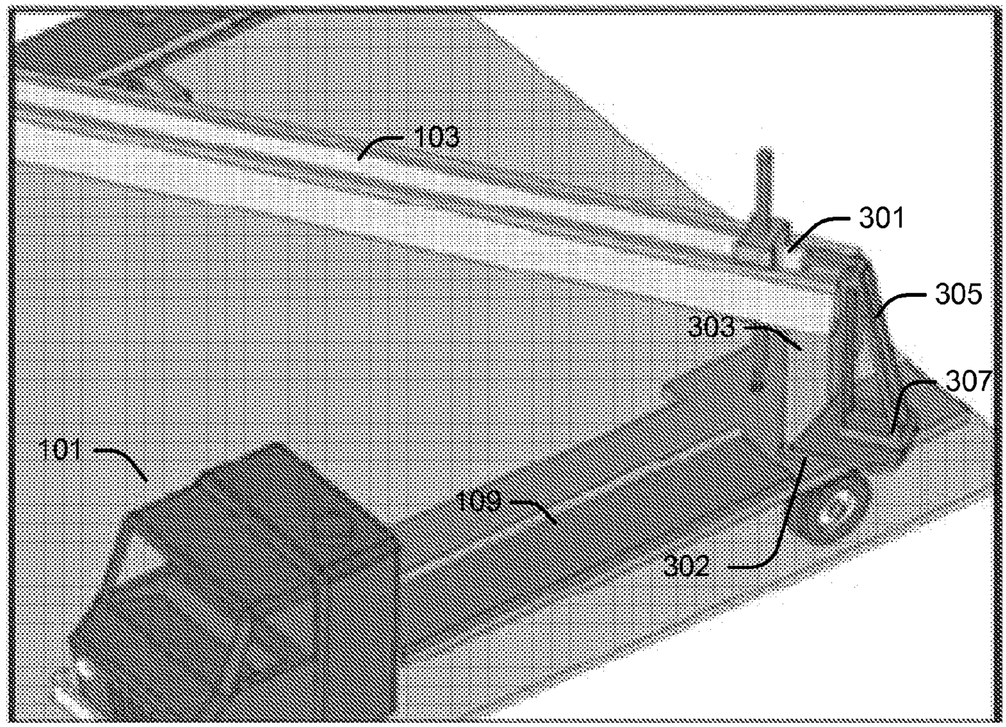
FIG. 3 illustrates the deployable crafting machine shown in FIG. 1 after a pivoted bridge has been partially swung into an expanded and operable state.

FIG. 3 illustrates the deployable crafting machine shown in FIG. 1 after the bridge has been partially swung into the expanded and operable state. As shown in FIG. 3, a pivot 301 may pivotally connect the bridge 103 to a bed 302 of the vehicle 101. The pivot may include a column 303 attached to the bridge 103 and a column support frame 305 releasably attached to the column 303. A conical locking pin (not shown) may be used for this purpose.

When the column support frame 305 is locked to the column 303, this may maintain the bridge 103 in its horizontal position while it is being swung, thus preventing the unsupported end of the bridge 103 from falling to the ground.

The pivot 301 may include a pivot platform 307, which may cooperate with the column 303 and the bed 302 to allow the column 303 to be aligned with the vehicle rail 109 after the bridge is swung. The bottom of the column 303 may rest upon a rail segment (not shown) which may be moved into alignment with the vehicle rail 109 after the bridge swings about 90 degrees.

Figure 4:
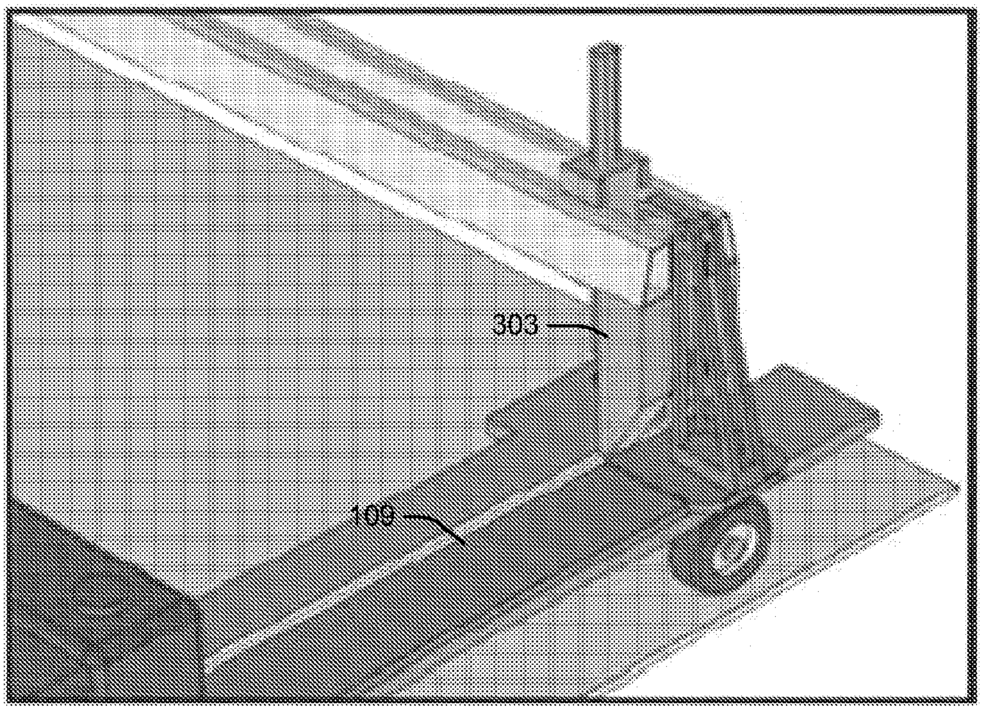
FIG. 4 illustrates the deployable crafting machine shown in FIG. 1 after the pivoted bridge has been completely swung into the expanded and operable state.

FIG. 4 illustrates the deployable crafting machine shown in FIG. 1 after the bridge has been completely swung about 90 degrees into the expanded and operable state. As shown in FIG. 4, the column 303 is now aligned with the vehicle rail 109.

Figure 5:
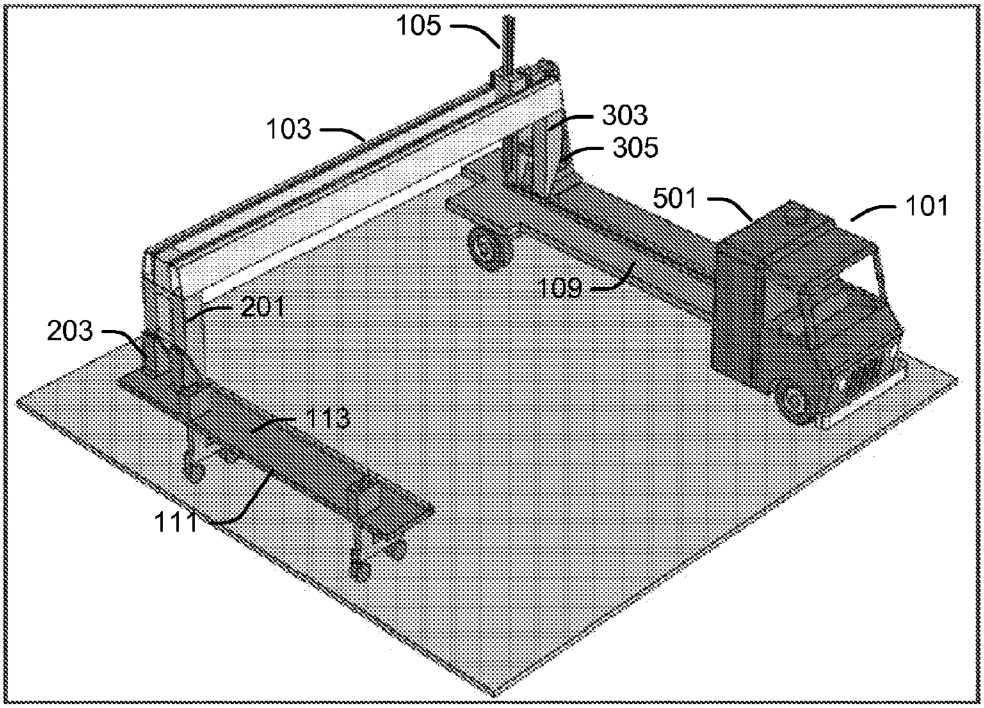
FIG. 5 illustrates the deployable crafting machine shown in FIG. 1 after the pivoted bridge has been completely swung into the expanded and operable state and attached to a column on the mobile platform.

FIG. 5 illustrates the deployable crafting machine shown in FIG. 1 after the bridge 103 has completely swung about 90 degrees into the extended and operable state. At this point, the forward end of the bridge 103 may be positioned over the column 201 and releasably attached to it. Again, a conical locking pin (not shown) may be used for this purpose.

The column 201 may now be disengaged from the column support frame 203,. Similarly, the column 303 may be disengaged from the column support frame 305. The bridge 103 may then be made to traverse back and forth over all or portions of the length of the rails 109 and 113. The material delivery nozzle 105 may similarly be made to traverse back and forth across all or portions of the length of the bridge 103. The traversing of the material delivery nozzle 105 and the bridge 103 may be done at the same or at different times.

While the material delivery nozzle 105 is traversing the bridge 103 and/or while the bridge 103 is traversing the rails 109 and 113, material may be delivered to and extruded from the nozzle 105. Material may also be extruded from the nozzle 105 while the bridge 103 and nozzle 105 are both stationary. The gantry system may be operable and supported at least in part by the vehicle 101 during operation of the gantry system.

The traversing of the bridge 103 and/or nozzle 105 may be controlled so as to cause layers of materials to be extruded, one fully or partially on top of the other, thus causing a surface to be built up, such as a wall. The traversing may be controlled so as to cause the wall to be straight or curved in a horizontal direction, in a vertical direction, in some other direction, or in any combination of these directions.

Any type of material may be extruded. For example, unhardened material may be extruded that later hardens, such as unhardened cementitious material.

The nozzle 105 may be configured to extrude more than a single stream of material at one time. For example, the nozzle may include three extrusion outlets, one of which is between the other two. The outer outlets may extrude a quick-hardening material, such as a material containing an accelerator admixture chemical, while the inner outlet may extrude a slow hardening material that flows and spreads easily, such as a self-consolidating concrete or admixture.

During the first traverse of a wall, quick-hardening material may be extruded from the outside two ports, while no material may be extruded from the central port. The outside extruded tracks may then be allowed to dry. During a second traverse over the same path, slow-hardening material may be extruded from the central outlet, thus filling the void that was left after the first traverse between the first outer tracks. Simultaneously, the fast-hardening material may again be extruded from the exterior ports, causing a second set of exterior layers to be formed substantially on top of the first step. By continually traversing the path in this manner, a wall may be built up having a strong, slow-hardening core which is held in position while it is drying by weaker, but fast-hardening exterior tracks.

Figure 6:
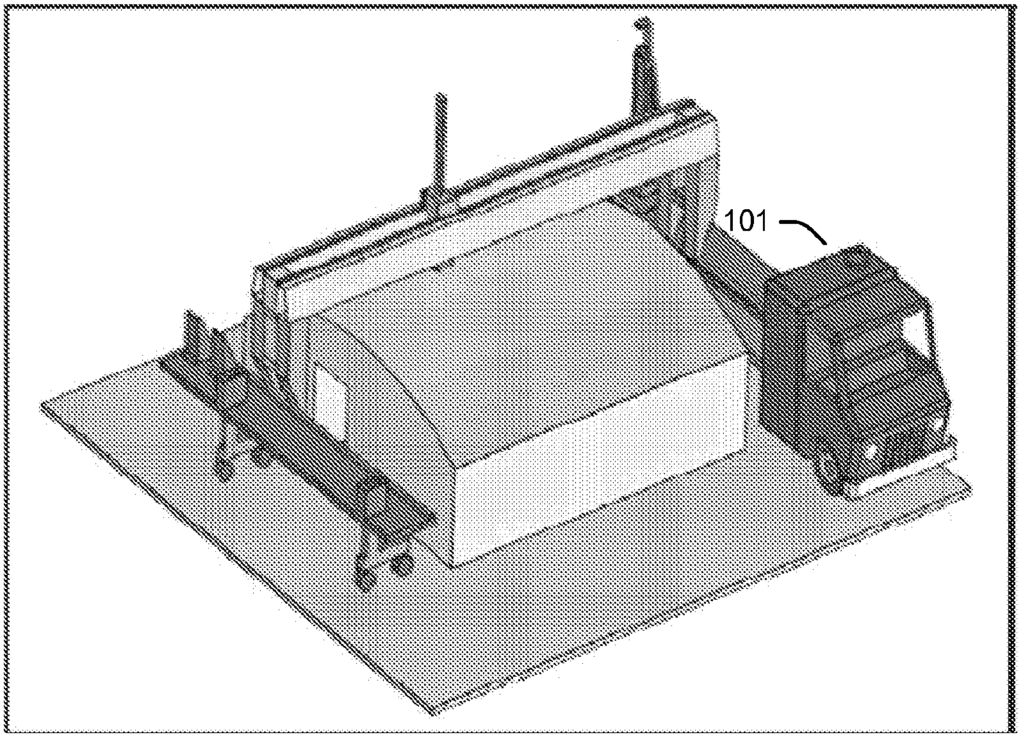
FIG. 6 illustrates the deployable crafting machine shown in FIG. 1 after the machine has crafted a building.

FIG. 6 illustrates the deployable crafting machine shown in FIG. 1 after the machine has crafted a building. Details concerning various nozzles and types of traverses and related techniques that may be used are set forth in the patent applications that are referenced in the Cross-Reference to Related Applications section of this application.

The traverses by the bridge 103 and the nozzle 105, as well as the delivery of materials to the nozzle 105 and the extrusion of materials from it may be controlled. These processes may be controlled by one or more operators using manual techniques. One or more motors, pumps, hoses, valves and other devices may be used to assist in connection with this control. For example, one or more motors may be used to cause the bridge to traverse the rails 109 and 113, as well as to cause the nozzle 105 to traverse the bridge 103. Similarly, one or more pumps may be used to deliver materials to the nozzle 105.

The pumps, motors, valves and other devices may be controlled by controllers, such as motor controllers. These controllers may be located on the platform 111, the vehicle 101, and/or elsewhere. The controllers, in turn, may be controlled by one or more operators and/or by one or more computers. When controlled by one or more computers, the computers may cause the entire extrusion process to be partially or fully automated. The computers may be programmed with a variety of templates, so as to cause the nozzle and gantry system to extrude a variety of structures, such as a variety of buildings. When in a fully automated mode, the operator may merely select one of several structures to be extruded. Thereafter, all of the operations that have been described above may proceed automatically without further guidance from the operator, including, without limitation, the detachment of the platform 111 from the vehicle 101, the lateral movement of the platform 111 to the separated position shown in FIG. 2, the rotation of the gantry arm into the operable position shown in FIG. 5, the traversing of the bridge 103 and the nozzle 105, the delivery of material to the nozzle 105, and/or the extrusion of material from the nozzle 105. One or more of these steps may also be implemented manually, or at least under manual control.

A tank 501 may be used to store the unhardened material that is delivered to the nozzle 105. The tank may be mounted on the vehicle, as shown in FIG. 5. It may instead be elsewhere.

Similarly, one or more pumps, motors, electric generators, motor controllers, and computers may be mounted on the vehicle or in compartments attached to or placed on the vehicle. One or more flexible material-delivery hoses may also be stored on the vehicle.

One or more of the components that are used during the contouring operation, such as the material tank and pump, may also or instead be mounted on a separate trailer that is hitched to the vehicle or that is otherwise brought to the construction site.

After a structure, such as a building, is extruded using the deployable crafting machine, the stabilizers on the vehicle 101 and/or the platform 111 may be removed. The wheels 115 and 119 on the platform 111 may then be rotated about a vertical axis approximately 90 degrees. The vehicle 101 and the platform 111 may then be moved forward to the next location at which a structure is to be extruded.

The vehicle 101 and the platform 111 may be moved forward in unison, thus obviating the need to detach the bridge 103 from the column 201 before the move is made. In this instance, a computer may control the movement of the vehicle 101 and/or the platform 111 so as to ensure that the movement is synchronized. Manual efforts by one or more operators may be used in addition or instead. Before making such a move, the column 201 may be re-attached to the column support frame 203, and the column 303 may be re-attached to the column support frame 305.

Another approach may be to re-attach the column 303 to the column support frame 305, to detach the bridge 103 from the column 201, to swing the bridge 103 until it returns to its original position over the vehicle 101, to separately move the vehicle 101 and the platform 111 to the next construction site, to swing the bridge 103 back over the column 201, to re-attach the bridge 103 to the column 201, and to realign the mobile rail 113 to the vehicle rail 109.

Figure 7:
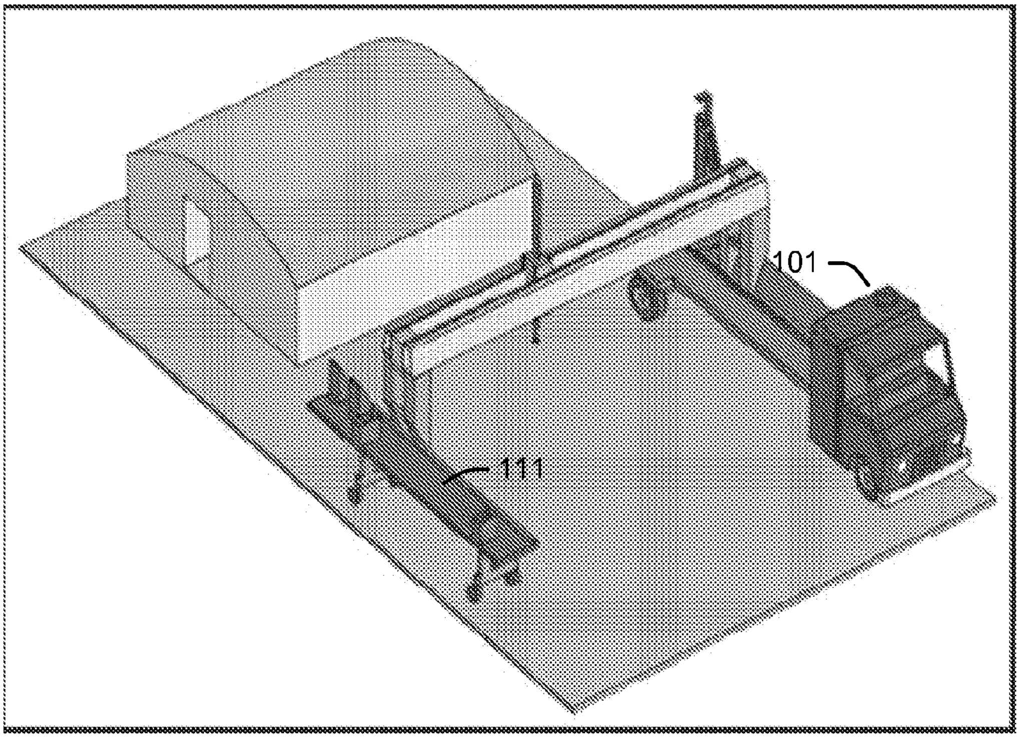
FIG. 7 illustrates the deployable crafting machine shown in FIG. 1 after being repositioned to craft a second building.

FIG. 7 illustrates the deployable crafting machine shown in FIG. 1 after being repositioned to craft a second building. While in this position, a second building may be extruded, following which the vehicle 101 and the platform 111 may again be moved forward in position for extruding a third building. This process may repeat until all of the desired structures at a particular location have been completed. Of course, the vehicle 101 and the platform 111 may be moved to locations that are not all in a straight line.

After all desired structures at a particular site have been extruded, the column 303 may be re-attached to the column support frame 305, the column 201 may be re-attached to the column support frame 203, the bridge 103 may be detached from the column 201, the bridge 103 may be swung back over the vehicle 101, the platform 111 may be rolled back to the vehicle 101, and the platform 111 may be re-attached to the vehicle 101. This would then bring the gantry system back to the collapsed and inoperable state. The vehicle 101 could then be moved to a new location with the collapsed and inoperable gantry system on board.

Figure 8:
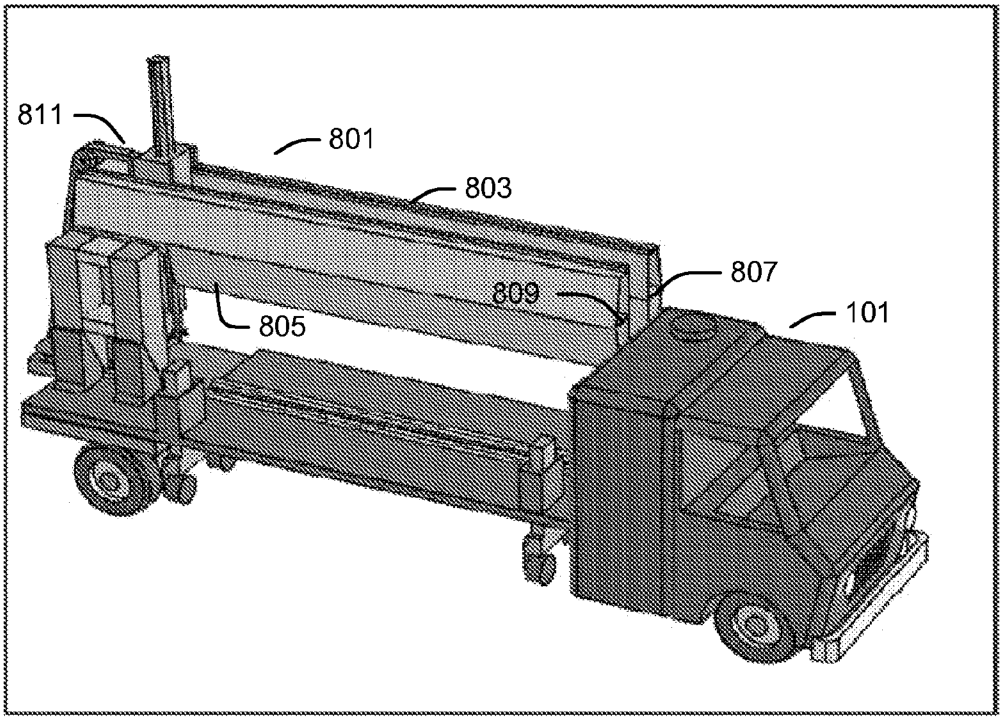
FIG. 8 illustrates another embodiment of a deployable crafting machine having a gantry system with a foldable bridge in a collapsed and inoperable state.

FIG. 8 illustrates another embodiment of a deployable crafting machine having a gantry system with a foldable bridge in a collapsed and in an inoperable state.

As illustrated in FIG. 8, the gantry system may include a bridge 801 having an upper segment 803 that is resting upon a lower segment 805. Hinges 807 and 809 may connect the two. As shown in FIG. 8, the length of the segment 805 may be shorter at the rear than the length of the segment 803 to accommodate a pivot 811.

Figure 9:
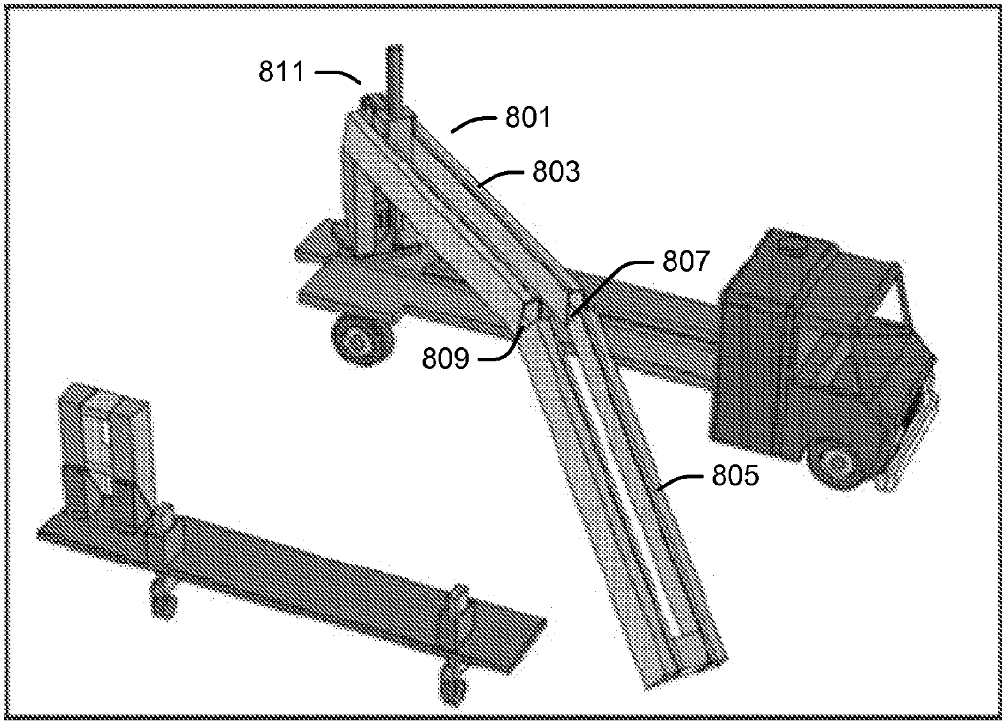
FIG. 9 illustrates the embodiment of the deployable crafting machine shown in FIG. 8 after the foldable bridge has been partially unfolded and partially swung into an expanded and operable state.

FIG. 9 illustrates the embodiment of the deployable crafting machine shown in FIG. 8 after the foldable bridge has been partially unfolded and partially swung into an expanded inoperable state. Except for the folding bridge, the configuration shown in FIGS. 8 and 9 may be the same as those discussed above in connection with FIGS. 1-7 and may be used in any of the same ways described above in connection with FIGS. 1-7. The configuration shown in FIGS. 8-9, however, may facilitate the extrusion of a wider structure and/or the use of a shorter vehicle.

Although being illustrated as consisting of only two segments, the bridge 801 may consist of a larger number of segments, similarly hinged or otherwise joined together. Alternatively, two or more segments may be telescoped within one another and extended to any desired length during deployment.

Figure 10:
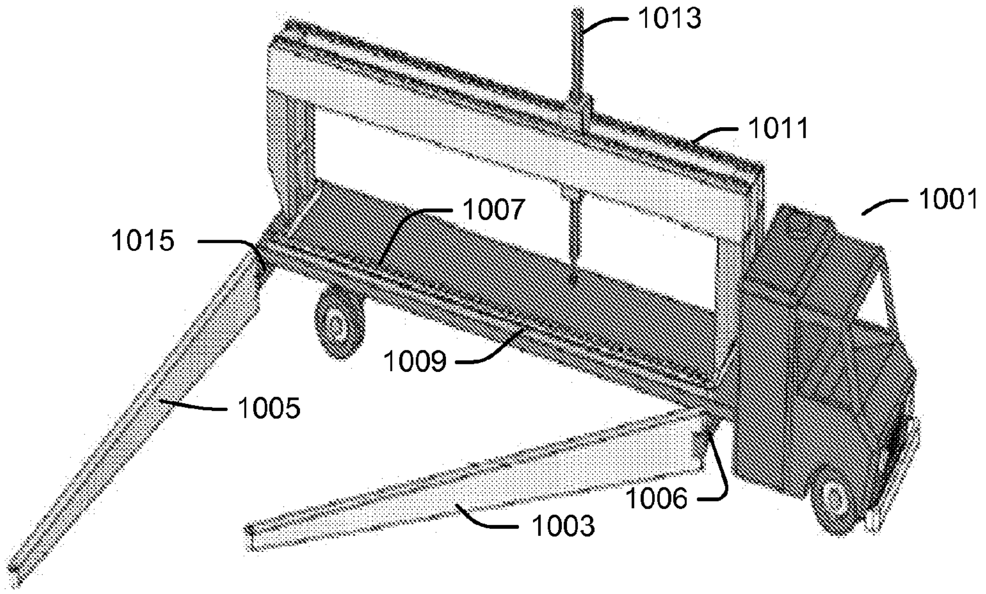
FIG. 10 illustrates another embodiment of a deployable crafting machine having a gantry system with two hinged trusses after the two hinged trusses have been partially swung into an expanded and operable state.

FIG. 10 illustrates another embodiment of a deployable crafting machine having a gantry system with two hinged trusses after the trusses have been partially swung into an expanded and operable state.

As shown in FIG. 10, a vehicle 1001 may carry a bridge 1011 in a collapsed an inoperable position. A material delivery nozzle 1013 may be movably attached to the bridge 1011. A vehicle rail 1007 may be attached to the bed of the vehicle 1010. A mobile rail 1009 may be releasably attached to the bed of the vehicle 1010 during transport. A front truss 1003 may be attached to the vehicle 1010 with a hinge 1006. Similarly, a rear truss 1005 may be attached to the vehicle 1001 with a hinge 1015.

Before and during transport, the front truss 1003 and the rear truss 1005 may be collapsed and placed in an inoperable state by folding them up against the length of the vehicle 1001. A releasable locking mechanism may be employed to maintain them in this collapsed position during transport.

Figure 11:
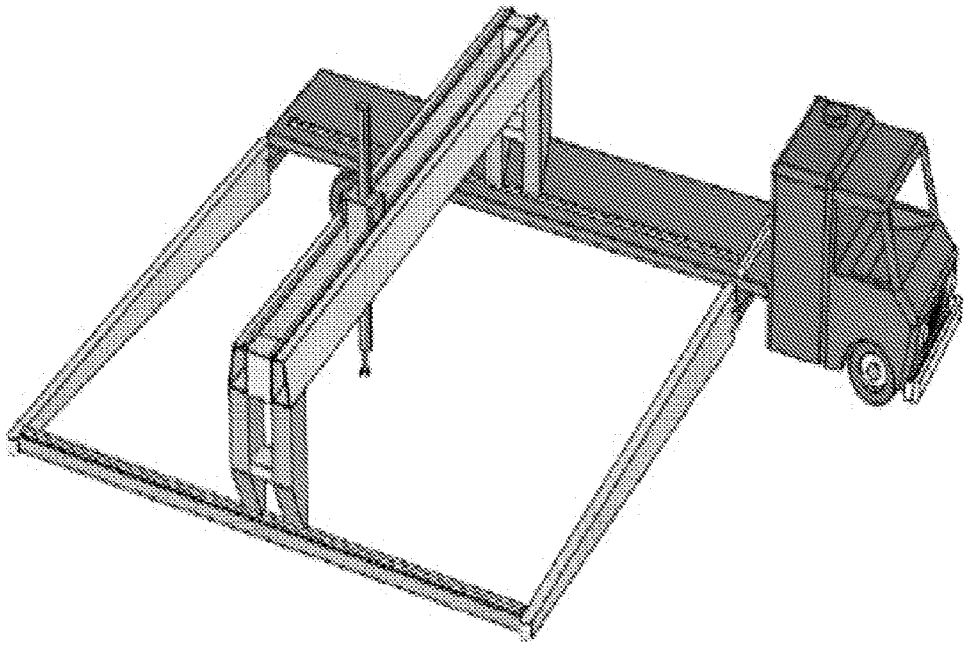
FIG. 11 illustrates the embodiment of the deployable crafting machine shown in FIG. 10 in the expanded and operable state.

Upon arrival at a construction site, the front truss 1003 and the rear truss 1005 may be unfolded, the mobile rail 1009 may be releasably attached to the distal ends of the front truss 1003 and the rear truss 1005 using pins or other attachment devices, and the bridge 1011 may be rotated and placed across the vehicle rail 1007 and the mobile rail 1009 so as to be able to traverse the trusses in an operable state, as shown in FIG. 11.

Except for the differences discussed above, the deployable crafting machine shown in FIGS. 10-11 may be configured and used in any of the ways discussed above in connection with FIGS. 1-9.

Figure 12:
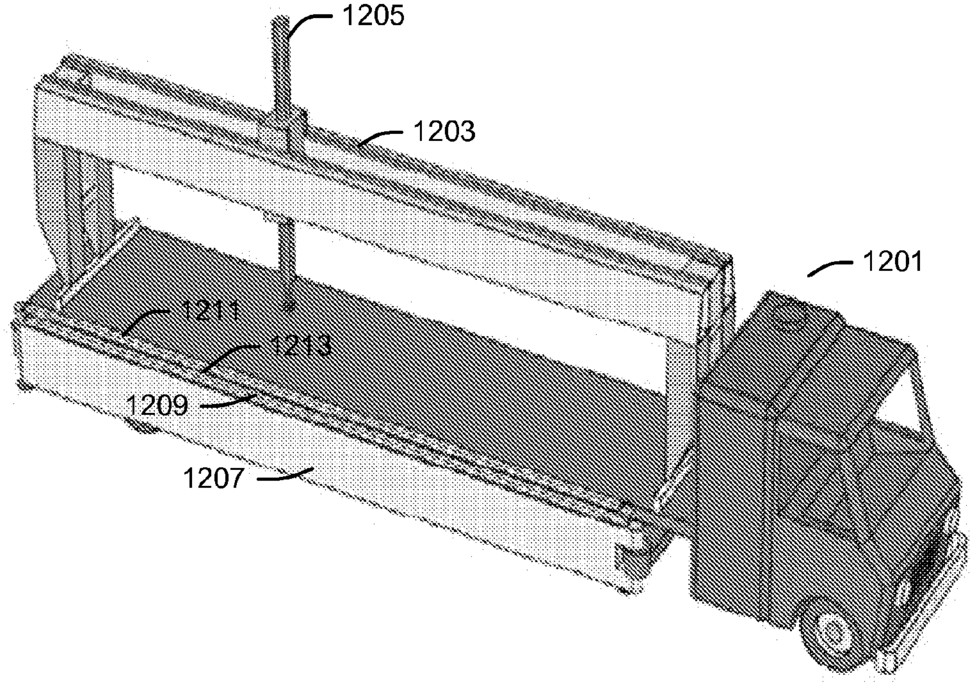
FIG. 12 illustrates another embodiment of a deployable crafting machine having a gantry system with two hinged rail supports in a collapsed and inoperable state.

FIG. 12 illustrates another embodiment of a deployable crafting machine having a gantry system with two hinged rail supports in a collapsed and inoperable state.

As shown in FIG. 12, a vehicle 1201 may carry a gantry system in a collapsed and inoperable state. The gantry system may include a bridge 1203, a material-delivery nozzle 1205 movably attached to the bridge 1203, a front truss 1207 supporting a mobile rail 1209, and a rear truss 1211 supporting a mobile rail 1213. The front truss 1207 and the rear truss 1211 may be releasably attached in the folded position shown in FIG. 12 to the vehicle 1201 both before and during transport.

Figure 13:
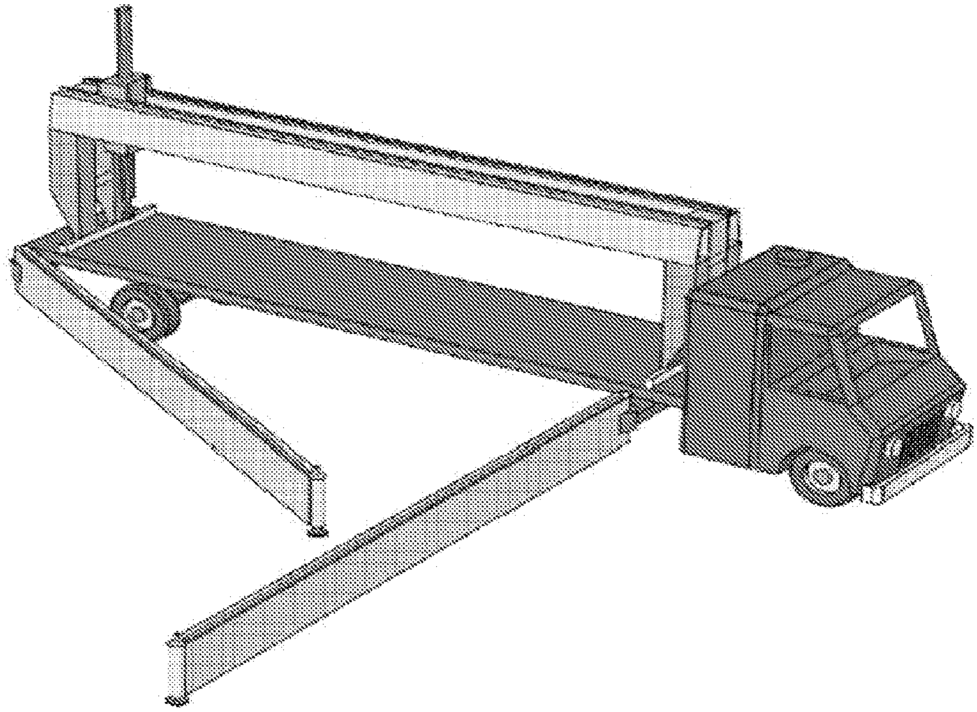
FIG. 13 illustrates the embodiment of the deployable crafting machine shown in FIG. 12 after the hinged rails supports have been partially swung into an expanded and operable state.

FIG. 13 illustrates the embodiment of the deployable crafting machine shown in FIG. 12 after the trusses 1207 and 1211 have been partially swung into an expanded inoperable state.

Figure 14:
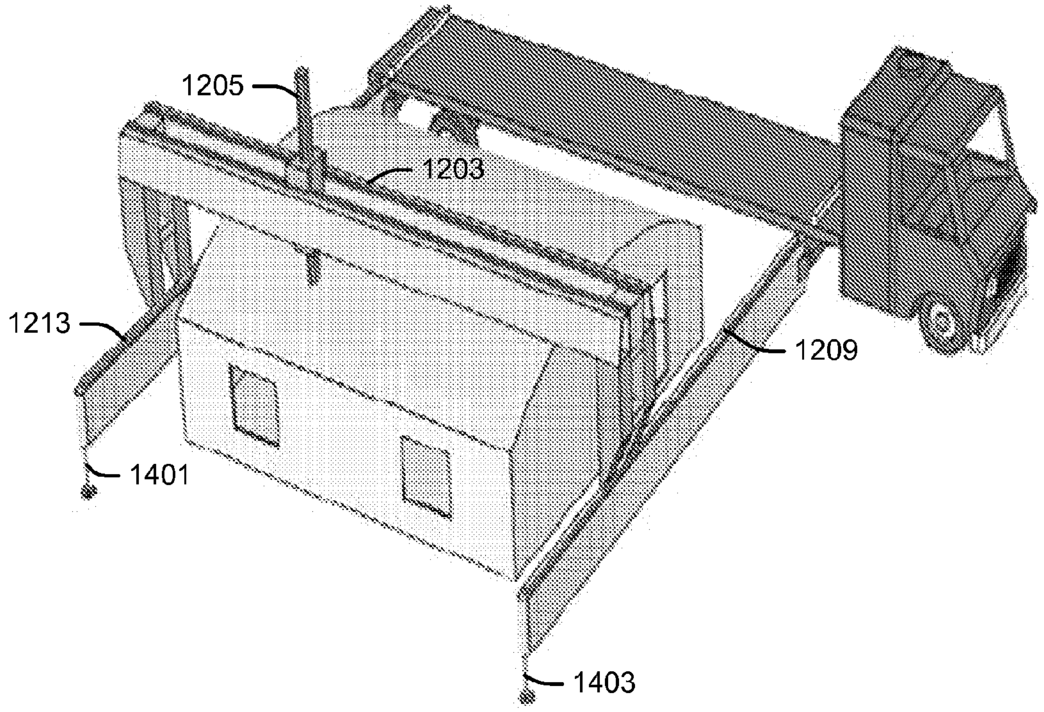
FIG. 14 illustrates the embodiment of the deployable crafting machine shown in FIG. 12 in the expanded and operable state after having contoured a building.

FIG. 14 illustrates the embodiment the deployable crafting machine shown in FIG. 12 in an expanded and operable state after having contoured a building.

Truss supports 1401 and 1403 may be used to stabilize the configuration and may be extended when the trusses 1207 and 1211 are in the extended position shown in FIG. 14 and retracted while they are being swung or in the collapsed position shown in FIG. 14. The amount of extension may be adjusted to ensure that the movable rails 1209 and 1213 are level.

Figure 15:
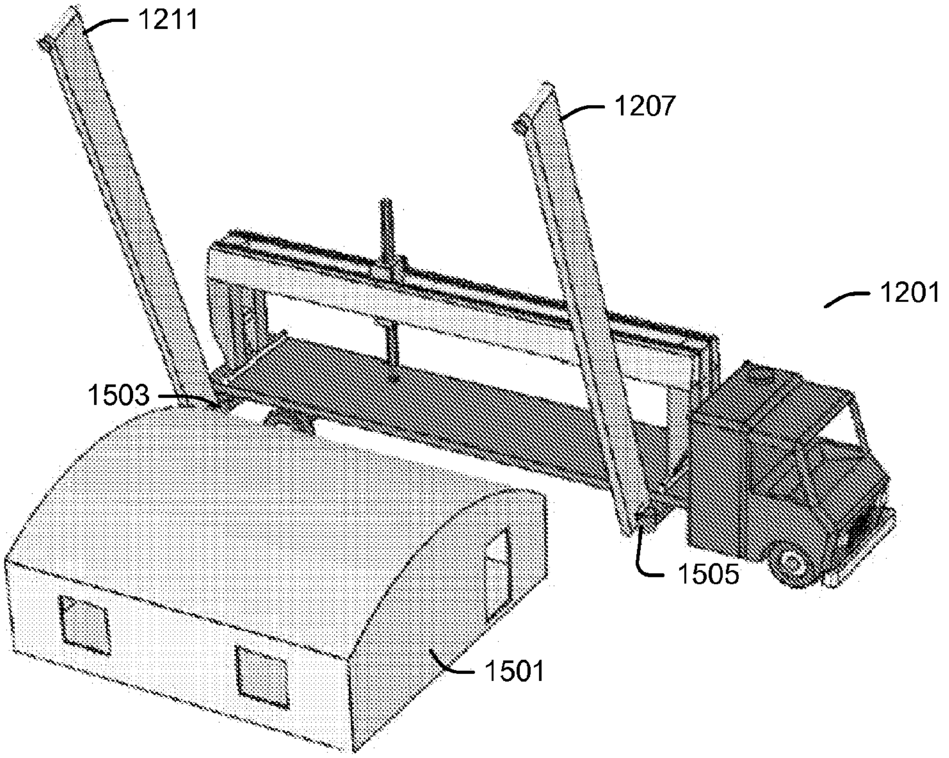
FIG. 15 illustrates the embodiment of the deployable crafting machine shown in FIG. 12 after the trusses have been partially swung back into the collapsed and inoperable state.

FIG. 15 illustrates the embodiment of the deployable crafting machine shown in FIG. 12 after the trusses have been partially elevated into a collapsed and inoperable state. This elevation allows the trusses 1207 and 1211 to be returned to their collapsed and inoperable state without interfering with the structure 1501 that has been extruded. To facilitate both the horizontal and vertical swinging of the trusses 1207 and 1211 that is illustrated in FIG. 13 and FIG. 15, respectively, hinges 1503 and 1505 may be used and configured to pivot about two orthogonal axes.

Appropriate power assist devices may also be employed, such as motors or hydraulic or pneumatic cylinders, to power the movement of the trusses, as described above. These power-assist devices may be controlled by an operator or, in whole or in part, by a computer system. In one embodiment, and as explained above, a computer system may fully automate the entire contouring process, including expanding and collapsing the gantry system.

Figure 16:
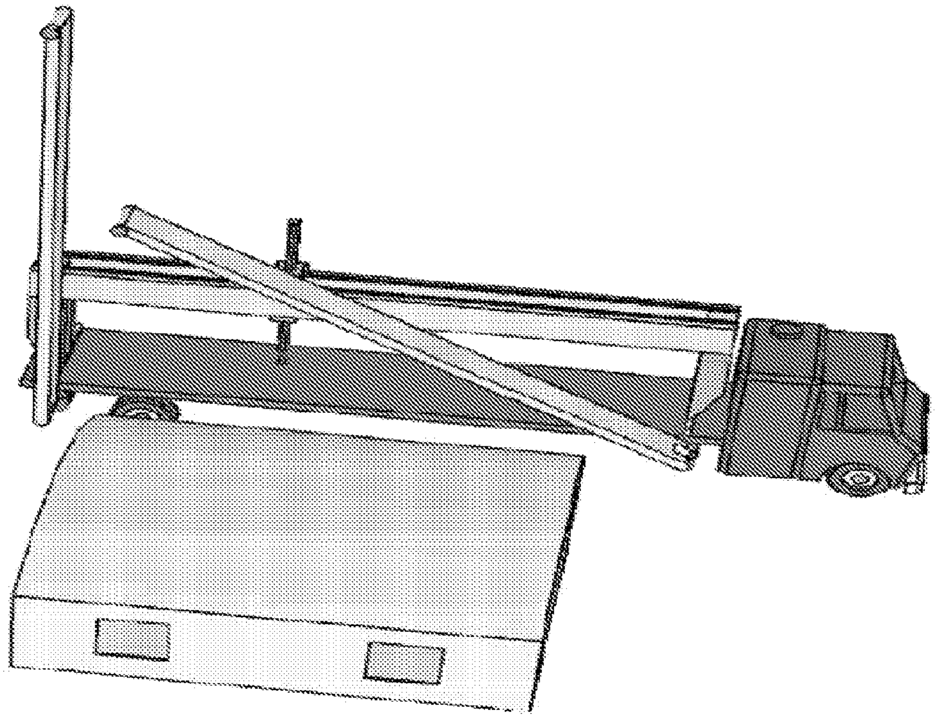
FIG. 16 illustrates the embodiment of the deployable crafting machine shown in FIG. 12 after the trusses have been partially swung even further back into the collapsed and inoperable state.

FIG. 16 illustrates the embodiment of the deployable crafting machine shown in FIG. 12 after the trusses have been partially swung even further back into a collapsed an inoperable state.

The types of hinges and truss movements shown in FIGS. 12-16 may be used in connection with the embodiment of the deployable crafting machine that is shown in FIGS. 10 and 11.

The deployable crafting machine shown in FIGS. 12-16 may be configured and used in any of the ways discussed above in connection with FIGS. 1-13, except that the bridge 1203 may move laterally with respect the vehicle, as opposed to longitudinally, while the nozzle 1205 may move longitudinally, as opposed to laterally.

Figure 17:
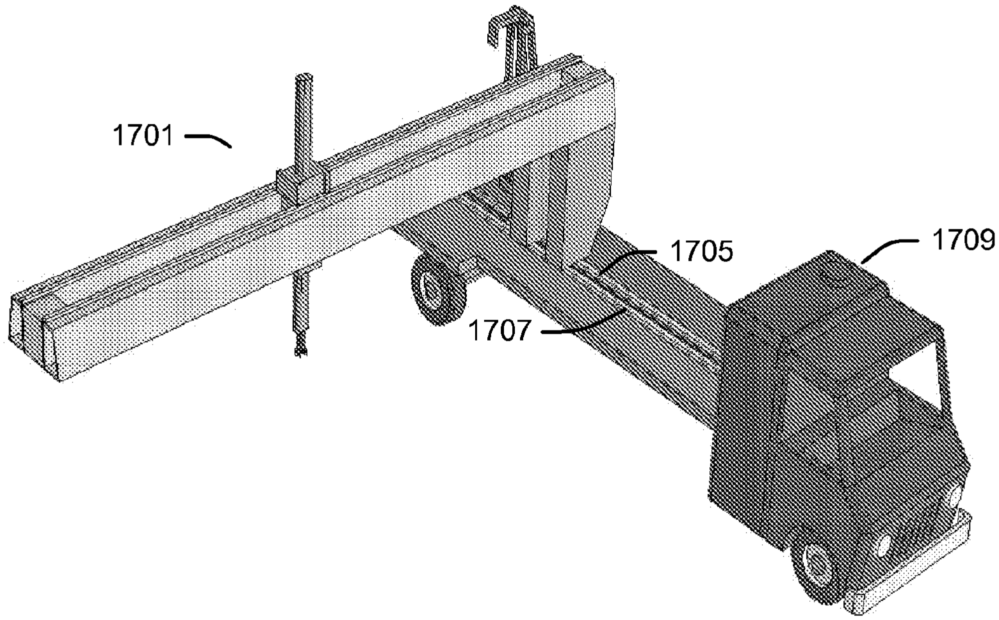
FIG. 17 illustrates another embodiment of a deployable crafting machine having a gantry system in an expanded and operable state.

FIG. 17 illustrates another embodiment of a deployable crafting machine having a gantry system in an expanded and operable state. As shown in FIG. 17, a gantry system 1701 may be movably attached at one end to parallel vehicle rails 1703 and 1705 on a vehicle 1709 and fully supported by this attachment, without a support at its other end. Securing links may be included to insure that the gantry system 1701 remains in the rails 1703 and 1705 in the horizontal position illustrated in FIG. 17 while it traverses the rails. A single rail or more than two rails may be used instead. Except for the absence of a support at the distal end of the gantry system 1701, the embodiment illustrated in FIG. 17 may otherwise contain all of the various components and operate in all of the various ways as the embodiments described above in connection with FIGS. 1-9.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently. In short, the scope of protection is limited solely by the claims that now follow. That scope is intended to be as broad as is reasonably consistent with the language that is used in the claims and to encompass all structural and functional equivalents.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

I claim:

1. A deployable contour crafting machine comprising:

a vehicle;

a nozzle configured to extrude cementitious material; and a gantry system configured to be collapsed on the vehicle during which the gantry system is inoperable and to be expanded during which the gantry system is operable and supported at least in part by the vehicle during operation of the gantry system, the gantry system being configured when operable to cause a first member of the gantry system to traverse linearly along a first axis and a second member of the gantry system to traverse linearly along a second axis that is substantially orthogonal to the first axis so as to move the nozzle substantially anywhere within a three-dimensional volume of space large enough to extrude a building from the nozzle and within the confines of the gantry system.

2. The deployable crafting machine of claim 1 wherein the gantry system includes a bridge configured when operating to traverse and to support the nozzle and to controllably move the nozzle along a horizontal path and a pivot attaching the vehicle to the bridge.

3. The deployable crafting machine of claim 2 wherein the bridge and pivot are configured to swing the bridge and to maintain the bridge in a substantially horizontal position while the bridge swings around the pivot.

4. A deployable contour crafting machine comprising:

a vehicle;

a nozzle configured to extrude cementitious material; and a gantry system configured to be collapsed on the vehicle during which the gantry system is inoperable and to be expanded during which the gantry system is operable and supported at least in part by the vehicle during operation of the gantry, the gantry system being configured when operable to move the nozzle linearly along each of three substantially orthogonal axes so as to enable the nozzle to move substantially anywhere within a three-dimensional volume of space large enough to extrude a building from the nozzle and within the confines of the gantry system, wherein the gantry system includes a rail, a column, and a detachable platform, and wherein the platform is configured to be attached to the vehicle when the gantry system is inoperable and to be detached and separated from the vehicle by sideways sliding movement when the gantry system is operable, supporting the rail and column slidably on top of the rail.

5. The deployable crafting machine of claim 4 wherein the platform includes wheels.

6. The deployable crafting machine of claim 5 wherein the wheels are configured to be raised to make the gantry system inoperable and lowered to make the gantry system operable.

7. The deployable crafting machine of claim 5 wherein the wheels are configured to rotate around both a vertical and a horizontal axis.

8. The deployable crafting machine of claim 4 wherein the gantry system includes a second rail attached to the vehicle and an alignment system configured to aid in aligning the two rails with respect to one another.

9. The deployable crafting machine of claim 8 wherein the alignment system is configured to aid in aligning the two rails to be parallel.

10. The deployable crafting machine of claim 9 wherein the alignment system includes a pivot between the vehicle and the second rail that is attached to the vehicle configured to allow the second rail to rotate in a horizontal plane with respect to the vehicle.

11. The deployable crafting machine of claim 8 wherein the alignment system is configured to aid in aligning the two rails to be at the same horizontal level.

12. The deployable crafting machine of claim 1 wherein the gantry system includes a forward truss, a hinge attaching the vehicle to the forward truss, a rear truss, and a hinge attaching the vehicle to the rear truss.

13. The deployable crafting machine of claim 12 wherein each of the hinges are configured to pivot about two orthogonal axes.

14. The deployable crafting machine of claim 12 wherein the gantry system includes a rail that is supported by the forward truss and another rail that is supported by the rear truss.

15. The deployable crafting machine of claim 12 wherein the gantry system includes a rail having two ends, wherein one end of the rail is configured to be supported by an end of the forward truss and the other end of the rail is configured to be supported by an end of the rear truss while the gantry system is expanded.

16. The deployable crafting machine of claim 1 wherein the gantry system includes a bridge configured to traverse during operation that has at least two sections which are in a collapsed position while the gantry system is an inoperable position and an open position while the gantry system is in an operable position.

17. The deployable crafting machine of claim 16 wherein the gantry system includes a hinge attaching the two sections of the bridge to one another and configured to allow the two sections to move between the operable and inoperable gantry system positions.

18. The deployable crafting machine of claim 1 wherein the gantry system includes a bridge and two rails, wherein the nozzle is movably attached to the bridge, and wherein the deployable crafting machine further comprises a positioning system configured to controllably move the nozzle along the bridge and to controllably move the bridge along the rails.

19. The deployable crafting machine of claim 18 wherein the positioning system includes one or more motors and one or more motor controllers.

20. The deployable crafting machine of claim 19 wherein the motor controllers are mounted on the vehicle.

21. The deployable crafting machine of claim 1 further comprising an electric generator mounted on the vehicle.

22. The deployable crafting machine of claim 1 further comprising a pump configured to pump unhardened cementitious material mounted on the vehicle.

23. The deployable crafting machine of claim 1 further comprising a tank configured to hold unhardened cementitious material mounted on the vehicle.

24. The deployable crafting machine of claim 1 wherein the gantry system is configured to be completely supported by the vehicle while expanded and during operation.

25. A deployable crafting process comprising:

moving a vehicle to a first location while a gantry system is stored on the vehicle in a collapsed and inoperable state;

expanding the gantry system into an operable state after the vehicle arrives at the first location; and supporting the gantry system at least in part by the vehicle while the gantry system is operated to cause a first member of the gantry system to traverse linearly along a first axis and a second member of the gantry system to traverse linearly along a second axis that is substantially orthogonal to the first axis so as to move a nozzle substantially anywhere within a three-dimensional volume of space large enough to extrude a building from the nozzle during operation of the gantry system.

26. The deployable crafting process of claim 25 further comprising extruding a building at the first location from the nozzle using the expanded gantry system.

27. The deployable crafting process of claim 26 wherein the extruding includes moving the nozzle along a bridge and extruding cementitious material from the nozzle while the nozzle is moving.

28. The deployable crafting process of claim 26 wherein the extruding crafting step includes moving the bridge along rails and extruding cementitious material from the nozzle while the bridge is moving.

29. The deployable crafting process of claim 26 further comprising:

moving the vehicle from the first location to a second location after the extruding; and extruding a second building at the second location using the gantry system.

30. The deployable crafting process of claim 29 wherein the gantry system is collapsed before the vehicle is moved from the first location to the second location.

31. The deployable crafting process of claim 29 wherein the gantry system remains expanded while the vehicle is moved from the first location to the second location.

32. A deployable crafting process comprising:

moving a vehicle to a first location while a gantry system is stored on the vehicle in a collapsed and inoperable state;

expanding the gantry system into an operable state after the vehicle arrives at first location in a manner that causes the gantry system to be supported at least a part by the vehicle;

using the expanded gantry system while supported at least in part by the vehicle to extrude a first building at the first location, including traversing a first member of the gantry system linearly along a first axis and a second member of the gantry system linearly along a second axis that is substantially orthogonal to the first axis;

collapsing the gantry system into the collapsed and inoperable state on the vehicle at the first location;

moving the vehicle to a second location while the gantry system is stored on the vehicle in the collapsed and inoperable state;

expanding the gantry system into an operable state after the vehicle arrives at second location in a manner that causes the gantry system to be supported at least in part by the vehicle;

using the expanded gantry system while supported at least in part by the vehicle to extrude a second building at the second location; and collapsing the gantry system into the collapsed and inoperable state on the vehicle at the second location.

33. A deployable crafting process comprising:

moving a vehicle to a first location while a gantry system is stored on the vehicle in a collapsed and inoperable state;

expanding the gantry system into an operable state after the vehicle arrives at first location in a manner that causes the gantry system to be supported at least in part by the vehicle;

using the expanded gantry system while supported at least in part by the vehicle to extrude a first building at the first location, including traversing a first member of the gantry system linearly along a first axis and a second member of the gantry system linearly along a second axis that is substantially orthogonal to the first axis;

moving the vehicle to a second location while the gantry system remains expanded in the operable state;

using the expanded gantry system to extrude a second building at the second location in a manner that causes the gantry system to be supported at least in part by the vehicle; and collapsing the gantry system into the collapsed and inoperable state on the vehicle at the second location.

* * * * *